United States Patent [19]

Patil et al.

[11] 4,292,294

[45] Sep. 29, 1981

[54] YELLOW PIGMENTS STABLE AT HIGH TEMPERATURES

[75] Inventors: Arvind S. Patil, Grosse Ile, Mich.; Lowell E. Netherton, Summit, N.J.

[73] Assignee: BASF Wyandotte Corporation, Wyandotte, Mich.

[21] Appl. No.: 115,309

[22] Filed: Jan. 25, 1980

Related U.S. Application Data

[63] Continuation-in-part of Ser. No. 37,567, May 9, 1979, abandoned.

[51] Int. Cl.³ .............................................. C01G 41/00
[52] U.S. Cl. .................................. 423/594; 252/62.63; 106/304; 106/292
[58] Field of Search ................. 423/594; 106/292, 304

[56] References Cited

U.S. PATENT DOCUMENTS

| | | | |
|---|---|---|---|
| 2,904,395 | 9/1959 | Downs et al. | 423/594 |
| 3,822,210 | 7/1974 | Iwase et al. | 423/594 |
| 3,832,455 | 8/1974 | Smith et al. | 423/594 |
| 3,887,479 | 6/1975 | McLain | 423/594 |
| 4,075,029 | 2/1978 | Nuss | 106/304 |
| 4,097,392 | 6/1978 | Goldman et al. | 423/594 |

OTHER PUBLICATIONS

Lih, "Color Technology", Chemical Engineering, Aug. 12, 1968, pp. 146–158.

*Primary Examiner*—Herbert T. Carter
*Attorney, Agent, or Firm*—David L. Hedden; Joseph D. Michaels

[57] ABSTRACT

A yellow pigment capable of withstanding elevated temperatures such as 200° C. is provided by the formation of a spinel of iron and other metal, such as Mg, Zn, and Sn. The pigment is made by a method which does not involve a step of calcining at high temperature, such as 600° to 1100° C., but rather involves precipitation from aqueous solution and subsequent exposure to elemental oxygen, as by aeration, to form submicron-sized particles of desired spinel.

10 Claims, 3 Drawing Figures

YELLOW PIGMENTS STABLE AT HIGH TEMPERATURES

CROSS-REFERENCE TO RELATED APPLICATION

This application is in part a continuation of our copending application Ser. No. 37,567, filed May 9, 1979 and now abandoned.

FIELD OF THE INVENTION

The present invention relates to inorganic pigments and to a method for making them. More particularly, the present invention concerns yellow pigments derived from inorganic materials. Even more particularly, the present invention concerns yellow pigments stable at high temperatures.

PRIOR ART

As is known to those skilled in the art to which the present invention pertains, yellow inorganic pigments, except nickel titanate, are not suitable for processing into plastics because of their thermal instability at temperatures above 175° C. Thus, yellow pigments such as iron oxide, lead chromate and zinc chromate are not well chosen for the yellow coloring of plastics such as polyethylene, polypropylene, polyvinyl chloride, polycarbonates, polyamide and the like. Furthermore, organic pigments show color degradation at temperatures of about 175° C., thereby precluding their use in the processing of plastics. Thus, the need for yellow pigments stable at high temperatures is readily apparent.

As will subsequently be detailed, the present invention provides such stable yellow pigments.

STATEMENT OF RELEVANT PATENTS

To the best of applicants' knowledge, the following patents are the ones most relevant to a determination of patentability:

U.S. Pat. Nos. 2,904,395, 4,097,392, 3,822,210, 3,887,479, 4,075,029, 3,832,455.

Perhaps the most pertinent of the patents mentioned above is Iwase et al. U.S. Pat. No. 3,822,210. Although this patent teaches the making of zinc ferrite (spinel) pigments, it does not teach or suggest the present invention because it uses a method which is different from that of our invention, and its different method produces a different product. The products made by Iwase et al. are isotropic ferrites. They are made under conditions of temperature and mole ratio of alkali to metal salts different from those taught in accordance with the present invention. Iwase et al. teach that their product is formed only if the conditions of temperature and mole ratio of alkali to metal salts fall above the dashed curve in FIGS. 2A to 2C of the patent. Moreover, their method involves heating the precipitate while oxidation is occuring.

The products made by the present invention are acicular (needle-like) ferrites. The product is formed under conditions of temperature and mole ratio of alkali to metal salts which are different from those disclosed in Iwase et al. Moreover, our method provides that heating of the precipitate takes place after oxidation has occurred.

SUMMARY OF THE INVENTION

In accordance with the present invention, yellow pigments are provided by a spinel of iron and a metal selected from the group consisting of Mg, Zn, and Sn, as well as mixtures thereof.

The spinels hereof may be produced by reacting a ferrous sulfate and a metal nitrate with a basic solution. The reaction proceeds at 5° to 50° C., preferably room temperature. The precipitate is then aerated and reheated to obtain the spinels hereof.

The spinels are temperature-stable up to about 900° C.

For a more complete understanding of the present invention, reference is made to the following detailed description and accompanying examples.

DESCRIPTION OF THE DRAWINGS

An understanding of the invention will be aided by consideration of the appended drawings, in which.

DESCRIPTION OF THE PREFERRED EMBODIMENTS

Figure 1:
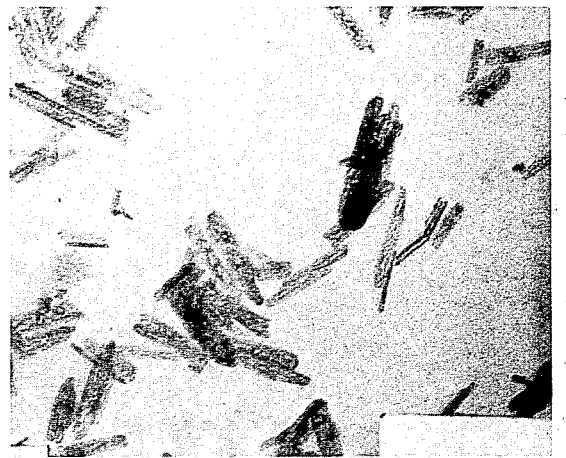
FIG. 1 is a photomicrograph at a magnification of 160000 diameters of zinc ferrite pigment particles made in accordance with the present invention starting from zinc nitrate.

The present invention provides yellow pigments which are temperature-stable up to about 900° C.

As is known to the skilled artisan, yellow iron oxide pigments are called "goethite". These pigments are considered to be hydrated oxides with a crystalline composition of alpha-FeOOH. It is the transformation of yellow alpha-FeOOH to a red alpha-$Fe_2O_3$ which causes color instability. The transformation of alpha-FeOOH to alpha-$Fe_2O_3$ occurs over a wide temperature range, beginning at 175° C., and is dependent upon the nature of the pigment and the particle size thereof.

The transformation is a function of temperature and length of time of exposure to such temperature. Generally, those skilled in the art consider the transformation to involve the dehydration of alpha-FeOOH to alpha-$Fe_2O_3$. A study of this phase transformation using differential thermal analysis shows that the transformation is complete at 265° C. to 277° C., although the transformation commences at much lower temperatures.

The present invention, as will subsequently be detailed, is based upon the fact that the phase transformation is related not solely to dehydration but also to crystalline structure. For example, all four hydrated iron oxides with a composition of FeOOH differ in color by virtue of their crystalline structure, only alpha-FeOOH being yellow.

The present invention provides spinels of iron with various metals to produce stable yellow pigments. The various metals which are amenable hereto are selected from the group consisting of Mg, Zn, Sn, as well as mixtures thereof.

Although the applications do not wish to be bound by any theory, it appears that, by virtue of the distribution of iron and other atoms within the spinel structure, the mobility of the iron atom is greatly inhibited and restricted. This restriction is further fortified by the electrostatic interaction between the metals, iron, oxygen and hydroxyl groups in the pigment. This restricted mobility results in a higher requirement of thermal energy to bring about the yellow-to-red color transformation of the iron oxide.

The spinels hereof may be produced by the reaction of hydrated ferrous sulfate and a metal nitrate hydrate or its equivalent in a solution, initially acidic, which has been subsequently brought to an alkaline pH. The reaction preferably proceeds at room temperature although those skilled in the art will appreciate that other temperatures such as 5° to 50° C. also may be used, if desired. The precipitate so obtained is then oxidized to promote the oxidation of the ferrous iron.

To state the present invention in its method aspect comprehensively, this invention may be viewed as comprising a method of making a pigment having good stability at high temperatures, said method comprising the steps of forming a first aqueous solution consisting essentially of water, a soluble ferrous salt, and at least one other salt, said salt being a soluble salt of a non-ferrous metal selected from the group consisting of magnesium, zinc, and tin, said ferrous salt and said non-ferrous salt being present in said solution in proportions such that the respective quantities of iron and other metal which are present will yield, when said solution is so adjusted in pH as to cause precipitation, the formation of a substantial quantity of a precipitate oxidizable to a spinel of the formula $XFe_2O_4$, in which X is a metal selected from the group consisting of magnesium, zinc, and tin; mixing with said first aqueous solution a second aqueous solution to form a reaction mixture, said second solution containing a substantial proportion of a soluble alkalizing compound selected from the group consisting of the carbonates, bicarbonates, and hydroxides of the alkali metals, the said second solution being used in such quantity and the said first and second solutions being in such a state of dilution that there results upon said mixing the formation of a precipitate in the form of particles of sub-micron size, the liquid phase of said reaction mixture being as a result of such precipitation substantially completely depleted in its content of metal ions having a valence greater than one; oxidizing at 15° to 35° C. the said precipitate to form a spinel in aqueous solution; then heating said aqueous solution having said spinel therein to a temperature of from about 75° to 100° C.; and recovering said spinel.

Although we have worked particularly with hydrated metal nitrates, among which $Mg(NO_3)_2.6H_2O$ and $Zn(NO_3)_2.6H_2O$ may be specifically mentioned, those skilled in the art will appreciate that it may in certain instances be possible to achieve the desired results with other equivalent materials which will suggest themselves to those skilled in the art. The use of hydrated salts is in general to be preferred, because such salts usually can be dissolved in water somewhat more quickly, other things being equal, than their anhydrous counterparts. After an aqueous solution of a desired strength has been obtained, it makes no difference whether the salt was or was not originally in the hydrated form.

Various other soluble anions may sometimes be used in place of nitrate, such as chloride or sulfate. As has been mentioned elsewhere, divalent tin may be used as a cation.

Suitable bases or solutions thereof are alkali-metal bases such as the sodium, potassium, or lithium carbonates, hydroxides, bicarbonates and the like. A particularly preferred base is sodium carbonate. Generally, a stoichiometric equivalent or base is employed. To be more specific, this means the use of one mole of sodium carbonate (or its equivalent, such as two moles of sodium bicarbonate) for each mole of, for example, hydrated ferrous sulfate. Insofar as its effect upon, for example, ferrous sulfate is concerned, the sodium carbonate may be considered as taking part in the reaction

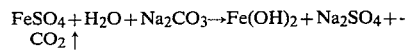

$$FeSO_4 + H_2O + Na_2CO_3 \rightarrow Fe(OH)_2 + Na_2SO_4 + CO_2 \uparrow$$

Insofar as its effect upon, for example, magnesium nitrate is concerned, the sodium carbonate may be considered as taking part in the reaction

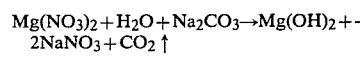

$$Mg(NO_3)_2 + H_2O + Na_2CO_3 \rightarrow Mg(OH)_2 + 2NaNO_3 + CO_2 \uparrow$$

The use of a stoichiometric quantity of sodium carbonate or the like is usually to be preferred, but satisfactory results can be obtained in some cases, whether the quantities used are in a stoichiometric relation or not. By "satisfactory results", we mean obtaining by reaction in an aqueous medium an appreciable yield of a fine-particled spinel having a desired composition and good high-temperature stability. If the departure from the quantities dictated by stoichiometry is not too great, an appreciable yield of the desired spinel can be obtained, even though the process is operated somewhat wastefully in respect to its use of carbonate or of metal salt. It is necessary to use at least enough of sodium carbonate to precipitate both the iron and a substantial proportion of the other metal, such as zinc.

In the practice of the present invention, obtaining particles of the desired size is an important consideration. The particle size is in part dependent upon the degree of dilution of the reactant solutions employed; the use of solutions more dilute yields particles of finer size, other things being equal.

It will be understood that the oxidation may be done conveniently, in most cases, by aeration at about room temperature, i.e., approximately 15° to 35° C.

Oxidation can be performed in any suitable manner. One way is aeration (spraying the suspension-containing solution into air from a perforated pipe). Another is bubbling air or a mixture of oxygen and inert gas through the suspension-containing solution. Another is shaking the suspension-containing solution in a vessel along with air or a mixture of oxygen and an inert or unreactive gas. Still another possibility is the use of a suitable chemical oxidizing agent, such as hydrogen peroxide or any of a number of chemical oxidants which can provide oxygen but will not (as potassium permanganate or sodium dichromate would) tend to impart any color to the solution. The oxidation action which is required is one that it is not practical to obtain by allowing the solution to stand while exposed to air or an atmosphere of oxygen. Oxidation can be monitored by titration to determine when it has been completed.

The solution is then heated to a temperature of from about 75° C. to about 100° C. It is desirable to maintain the high temperature for a time long enough to "set the crystal", i.e., ensure the development of desired crystalline forms in the product. X-ray diffraction tests can be used to monitor the progress and ensure the completion of the development of the desired crystalline forms.

The spinel is then recovered by conventional filtration and washing techniques.

The spinel thus obtained has a very fine particle size. The spinel particles are substantially all of a size under one micron in maximum dimension, and in most cases, they are even finer, such as 0.1 micron in maximum dimension. The performance of pigments containing the spinel particles is dependent upon their having particles of the size indicated. In general, a fusion process for obtaining spinels results in particles substantially larger than those obtained with the present invention. Fine particles made according to the present invention give purer colors than larger particles, made by a fusion process, do.

Figure 2:
FIG. 2 is a photomicrograph at the same magnification of zinc ferrite pigment particles made in accordance with the invention, starting from zinc sulfate.
Figure 3:
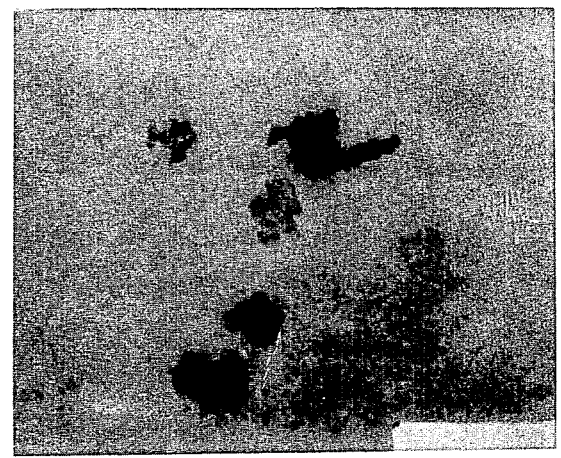
FIG. 3 is a photomicrograph at the same magnification of particles as shown in FIG. 1, after they have been calcined at 600° C. for 20 minutes.

In further description of the temperature-stable spinel product made in accordance with the invention, it may be stated that a procedure of the kind detailed above gives particles which are of acicular (needle-like) shape and, as is revealed in the drawings, of a length which is on the order of 0.01 to 0.13 microns. FIG. 1 corresponds to the product of Example III, below, and FIG. 2 is a photomicrograph of a similar product, but one made by starting with zinc sulfate instead of zinc nitrate. FIG. 3 shows the effect of calcination upon the product shown in FIG. 1; the particles are no longer acicular.

The photomicrographs reveal that the process discussed above yields a product different from any encountered in the above-mentioned U.S. patents. The particles of U.S. Pat. No. 2,904,395 are said to be acicular, but with a length of 0.4 to 1.0 micron, as compared with about 0.01 to 0.13 micron for the particles shown in FIGS. 1 and 2.

That the materials shown in FIGS. 1 and 2 are spinels has been confirmed by X-ray diffraction tests. The same materials exhibit an absence of the characteristic endotherm in differential thermal analysis at a temperature around 260° to 277° C. Such endotherm is characteristic of phase transformation of yellow alpha-FeOOH to red $Fe_2O_3$. This means that the materials in FIGS. 1 and 2 are spinels and are not alpha-FeOOH.

U.S. Pat. No. 3,832,455 does not provide information concerning the size and shape of the particles produced by its teachings, but its method involves a necessary calcining step, and in view of FIG. 3, it appears unlikely that it yields a product containing acicular particles. U.S. Pat. No. 3,887,479 similarly involves use of high temperatures and does not contain information concerning the morphology of its product particles. The differences between the particles of U.S. Pat. No. 3,822,210 and those of the present invention are apparent from a consideration of FIGS. 1 to 3 hereof and the photomicrographs in that patent, allowance being made for the difference in scales between them and FIGS. 1 to 3.

After they have been obtained as indicated above, the fine-particled spinels made according to the invention may be incorporated in plastics as a pigment to produce a desired yellow, by using proportions and practices well known to a person of ordinary skill in the art.

In practicing the present invention, the spinels are preferably derived from iron and Mg, Zn, or mixtures thereof. Such spinels show temperature stability up to about 900° C. Particularly good results have been obtained with the iron-zinc spinels, which are preferred.

Those skilled in the art will know how to incorporate the spinel pigments into plastics or the like. The necessary proportions, procedures, and equipment do not require explanation.

A comparison of weight loss versus temperature between a yellow iron oxide pigment of the prior art and an iron-zinc spinel of the present invention establishes that the spinel has less water, present as hydroxyl, than the pure iron oxide pigment. This is shown in Table I, below.

TABLE I

| Temp., °C. | % Wt. Loss | |
|---|---|---|
| | Iron-Zinc Spinel | Iron Oxide |
| 100 | 2.7 | 1.9 |
| 250 | 6.2 | 7.2 |
| 350 | 7.7 | 13.7 |
| 400 | 8.1 | 14.0 |

The chemical compositions of the spinels hereof generally correspond to the structure $XFe_2O_4$ where X is a metal as denoted above.

As hereinbefore noted, mixtures of metals can be utilized. However, electroneutrality in the crystal must be maintained.

Following are specific examples illustrating the principles of the present invention. These examples are to be construed as illustrating and not limiting the present invention.

EXAMPLE I

Into a suitable reaction vessel equipped with titration means, cooling means, aeration means and agitation means, there was added a three liter solution of 27.8 grams per liter (gpl) of $FeSO_4.7H_2O$ and 17 gpl $Mg(NO_3)_2.6H_2O$. With stirring, 200 milliliters of 231 gpl $Na_2CO_3$ solution was added thereto. The temperature in the vessel at the time of carbonate addition was 19° C.

With stirring, a precipitate is formed in the flask.

After precipitation ceased, air was bubbled into the flask via the aeration means. Contemporaneous with aeration, the oxidation of the ferrous sulfate was monitored by titration with potassium permanganate.

After aeration was completed, the precipitated solution was heated to 90° C. and maintained thereat for two hours, then cooled to room temperature. The precipitate was then recovered by filtration of the solution. The precipitate was then washed and dried. A temperature-stable yellow pigment was thus obtained. In other words, the pigment displayed, upon being subjected to differential thermal analysis, an absence of the transformation from goethite to hematite of the kind discussed herein above. The pigment also has been tested by being subjected to elevated temperatures, up to about 900° C., showing no change of color.

EXAMPLE II

Example I was repeated using an iron-metal solution of 27.8 gpl $FeSO_4.7H_2O$ and 19.8 gpl $Zn(NO_3)_2.6H_2O$, to which was added 46 gms of $Na_2CO_3$ solution. A yellow pigment which was temperature-stable was obtained.

EXAMPLE III

A solution containing 67 lbs. (30.4 kg.) of ferrous sulfate heptahydrate and 47 lbs (21.3 kg.) of $Zn(NO_3)_2.6H_2O$ was prepared in 150 gallons (567.8 liters) of water maintained at 20° C. To this solution was added a solution of 37 lbs. (16.8 kg.) of $Na_2CO_3$ dissolved in 19.3 gallons (73 liters) of water. The reaction mixture was aerated at 3 cubic feet per minute (84.9 liters per minute) of air until maximum oxidation of the ferrous ion occurred, as determined by potassium permanganate titration. The reaction mixture was then heated to 90° C., filtered, washed and dried. A temperature-stable yellow pigment was thus obtained.

EXAMPLE IV

Example III was repeated, except that 46 lbs. (20.9 kg.) of zinc sulphate heptahydrate were used in place of the indicated quantity of zinc nitrate hexahydrate. Once again, a temperature-stable yellow pigment was thus obtained.

EXAMPLE V

Samples of each of the pigments of Examples I-IV hereof were heated for ½ hour at 280° C. in an oven. Each sample remained yellow in color.

When heated to 800° C. for ½ hour, the samples still remained yellow.

In the claims, the term "transparent pigment" is used to indicate a pigment which is capable of being incorporated in a vehicle to provide a coating which is substantially transparent to visible light. This implies that the particles of pigment have a size less than the wavelength of visible light.

While we have shown and described herein certain embodiments of our invention, we intend to cover as well any change or modification therein which may be made without departing from its spirit and scope.

The embodiments of the invention in which an exclusive property or privilege is claimed are defined as follows:

1. A transparent, temperature-stable spinel in the form of acicular particles having a length of 0.01 to 0.13 microns and consisting essentially of oxygen, iron, and at least one other metal, said spinel corresponding to the formula $$XFe_2O_4$$

wherein X is said other metal, said other metal being one selected from the group consisting of magnesium, zinc and tin.

2. A spinel as defined in claim 1, wherein said other metal is one selected from the group consisting of magnesium and zinc.

3. A spinel according to claim 1 wherein the other metal is magnesium.

4. A spinel according to claim 1 wherein the other metal is zinc.

5. A method of making a transparent yellow pigment having good stability at high temperatures, said method consisting essentially of the steps of forming a first aqueous solution consisting essentially of water, a soluble ferrous salt, and at least one other salt, said salt being a soluble salt of a non-ferrous metal selected from the group consisting of magnesium, zinc, and tin, said ferrous salt and said non-ferrous salt being present in said solution in proportions such that the respective quantities of iron and other metal which are present will yield, when said solution is so adjusted in pH as to cause precipitation, the formation of a substantial quantity of a precipitate oxidizable to a spinel of the formula $XFe_2O_4$, in which X is a metal selected from the group consisting of magnesium, zinc, and tin mixing with said first aqueous solution a second aqueous solution to form a reaction mixture, said second solution containing a substantial proportion of a soluble alkalizing compound selected from the group consisting of the carbonates, bicarbonates, and hydroxides of the alkali metals, the said second solution being used in such quantity and the said first and second solutions being in such a state of dilution that there results upon said mixing the formation of a precipitate in the form of particles of sub-micron size, the liquid phase of said reaction mixture being as a result of such precipitation substantially completely depleted in its content of metal ions having a valence greater than one;

oxidizing at 15° to 35° C. the said precipitate to form a spinel in aqueous solution;

then heating said aqueous solution having said spinel therein to a temperature of from about 75° to 100° C.; and recovering said spinel.

6. A method as defined in claim 5, wherein said soluble ferrous salt is a hydrated salt.

7. A method as defined in claim 5, wherein said other metal is zinc.

8. A method as defined in claim 7, wherein said alkalizing compound is sodium carbonate.

9. A method as defined in claim 5, wherein said alkalizing compound is sodium carbonate.

10. A method as defined in claim 5, wherein the step of oxidizing is done by subjecting the precipitate to the action of aqueous elemental oxygen by aeration.

* * * * *